Sept. 2, 1930.    P. E. MATTHEWS    1,774,990
SELF ADJUSTING RADIUS ROD
Filed Jan. 18, 1929    2 Sheets-Sheet 1
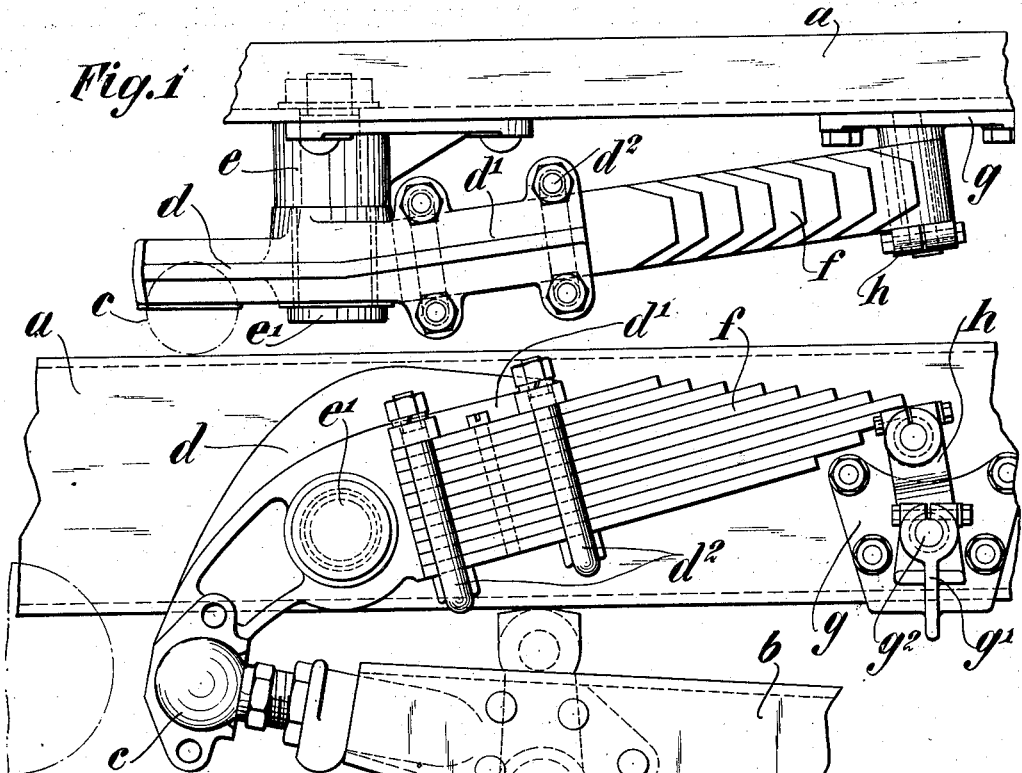
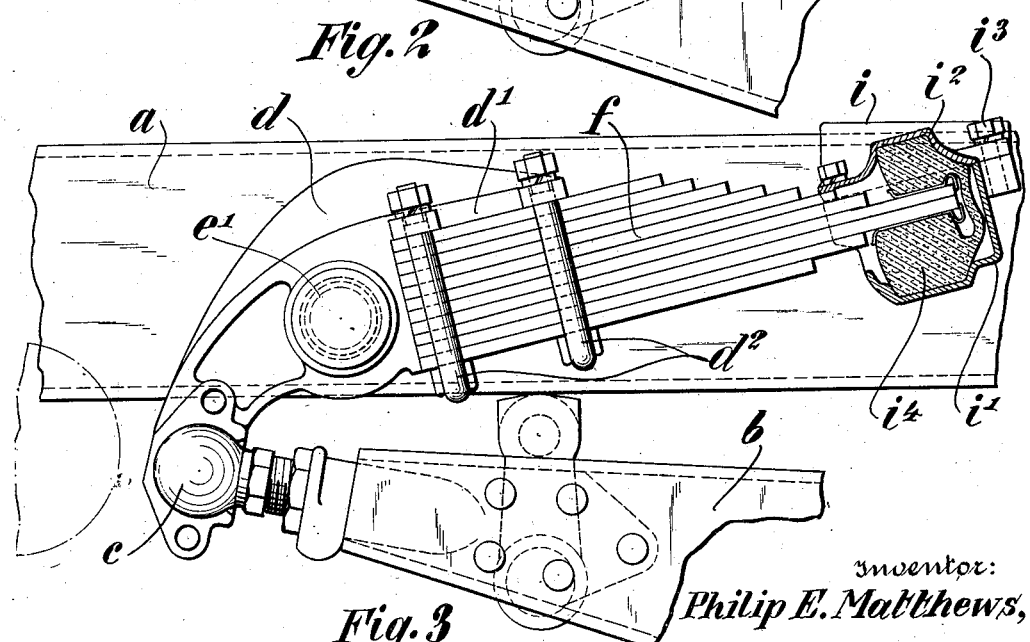
Inventor:
Philip E. Matthews,
By his Attorneys
Redding, Greeley, O'Shea & Campbell Sept. 2, 1930.     P. E. MATTHEWS     1,774,990
SELF ADJUSTING RADIUS ROD
Filed Jan. 18, 1929     2 Sheets-Sheet 2

Inventor:
Philip E. Matthews,
By his Attorneys
Redding, Greeley, O'Shea & Campbell Patented Sept. 2, 1930

1,774,990

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

SELF-ADJUSTING RADIUS ROD

Application filed January 18, 1929. Serial No. 333,404.

The present invention relates to radius rods for spacing the axle of a motor vehicle from the frame and transmitting the drive from the wheels to the body of the vehicle. More particularly, the invention embodies an improved form of radius rod which is mounted pivotally at one end upon the frame and provided with a means for absorbing, yieldingly, the stresses and sudden shocks transmitted from the radius rod to the frame.

Particularly in vehicles of the chain drive type, it has been found that, under certain conditions, the chain will become locked, resulting in subjecting the frame, as well as all of the driving elements to great stresses. For example, when a truck of the chain drive type backs up into a pile of sand, gravel or clay, such material becomes lodged in the chain and causes it to become tightened. Under these conditions, with a radius rod that is positively spaced between the frame and axle, the chain becomes locked and the engine is stalled. If the vehicle is heavily loaded and is accelerated from a position of rest, the relatively small amount of power available due to the slowest speed of the engine available in low gear, sometimes proves to be insufficient to start the vehicle. Where the condition of the ground is such that the wheels will slip and flywheel action is not possible, the engine cannot be sped up and the vehicle "flywheeled" out because of the slipping which results under the wheels.

An object of the present invention is to provide a means which yieldingly connects the radius rod to the frame in such manner that it will be impossible to lock the chain. In addition, the yielding connection further provides increased traction as well as increased power during acceleration.

The above object is attained by the use of a spring pivoted to the frame and connected to the radius rod in such manner that the forces transmitted through the radius rod to the frame will be applied to the latter through the spring.

Further objects will appear as the invention is described in greater detail in connection with the accompanying drawings, wherein:

Figure 1 is a plan view showing one form of the invention.

Figure 2 is a view in side elevation, showing the device of Figure 1.

Figure 3 is a view in side elevation, similar to Figure 2, but showing a modified form of the invention.

Referring to the above drawings, $a$ designates the side frame member of a vehicle provided with a radius rod $b$. This radius rod transmits the driving force from the rear axles, not shown, to the frame $a$ and is connected through a ball and socket joint $c$ of conventional form to the end of a crank arm $d$. A bracket $e$ is secured to the frame member $a$ and provided with a pivot shaft $e'$ for mounting, pivotally, the crank arm $d$.

Upon the opposite side of the pivot from the ball and socket joint $c$, the crank arm is formed with a boss $d'$ to which a leaf spring $f$ is secured by means of U-shaped bolts $d^2$.

A second bracket $g$ is mounted upon the frame and carries an arm $g'$ provided with a pivot shaft $g^2$. Between the pivot shaft $g^2$ and the end of the spring $f$, a link $h$ is mounted, thus permitting relative movement between the end of the spring $f$ and the pivot shaft $g^2$.

In the form shown in Figure 3, the bracket $g$ is replaced by a bracket $i$ carrying a housing $i'$ with a cover $i^2$ secured thereto by means of bolts $i^3$. Within the housing, a block of yielding non-metallic material $i^4$ is carried, the end of the spring $f$ being received within this block. This block, which may be formed of rubber, serves to cushion the forces transmitted between the frame and spring as will be quite apparent.

Figure 4:
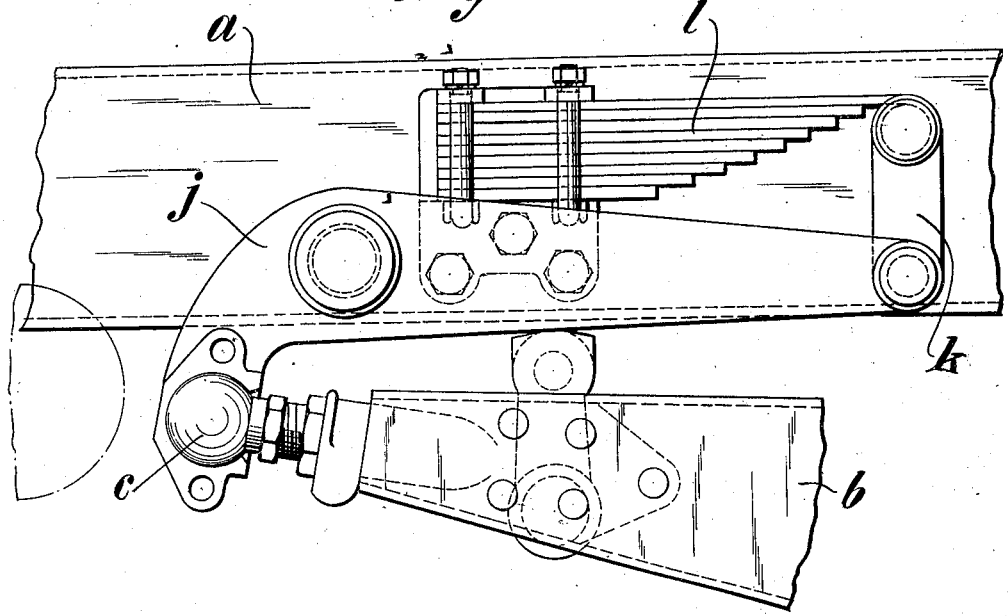
Figure 4 is a view in side elevation, showing a further modified form of the invention.

In the device shown in Figure 4, a bell crank $j$ replaces the crank arm $d$ and is pivotally connected to a link $k$ which is pivoted to the end of the spring $l$ which is mounted upon the frame. It will be seen that the action in this construction is similar to that in the previous devices, save that the spring is fixedly mounted upon the frame instead of being mounted upon the crank arm.

The manner in which the spring $f$ cushions the forces transmitted between the radius rod and frame will be quite apparent and, in practice, starting of the vehicle under heavy loads is greatly facilitated. During the flexing of spring $f$, the movement of the wheel with respect to the frame permits the speed of the engine to be increased materially, thus developing more power when the full load is applied after the spring ceases to yield further. In addition to the greater power available, the wheel has gotten in motion and the traction greatly increased by reason thereof. As previously stated, the yield between the sprocket and axle prevents locking of the chains which action would otherwise throw a great strain upon the axles, jack shafts, differential, bearings, frame, housings, radius rods, chains and sprockets.

Figure 5:
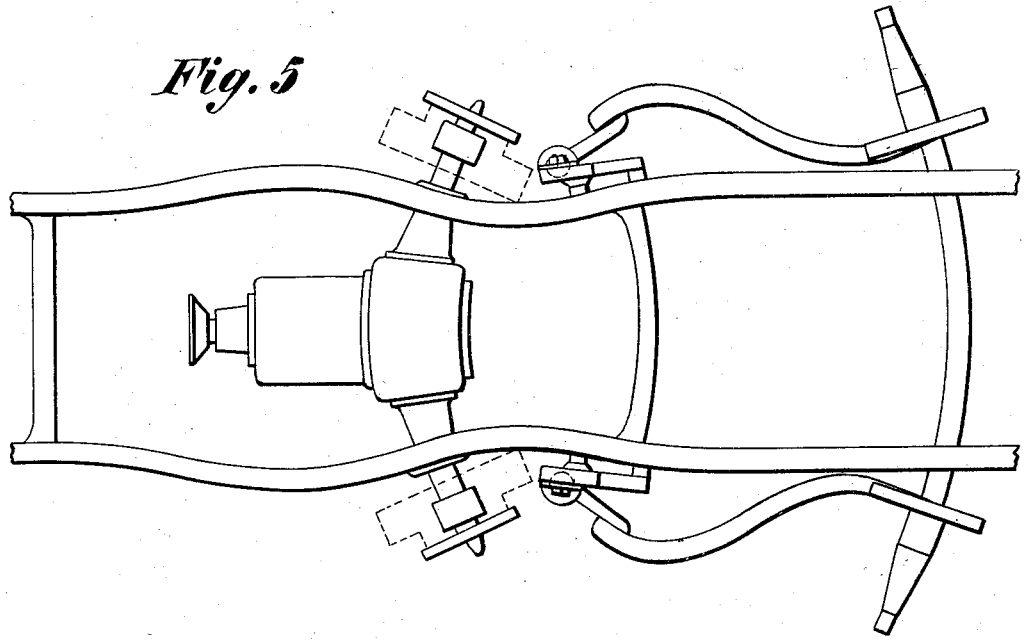
Figure 5 is a diagrammatic illustration of what happens when the chains lock in a chain drive vehicle.

In Figure 5, there is shown in greatly exaggerated form, the manner in which the above mentioned elements yield when the enormous strain resulting from locking of the chains is imposed thereon. Since the locking of the chain results from objects wedging in between the sprocket teeth and chain links, the effect is to shorten the distance between the axes of the axle and jack shaft. This results in a bending of the elements in the manner shown in Figure 5.

While the invention has been described with reference to the specific construction shown in the accompanying drawings, it is not to be limited, save as defined in the appended claims.

I claim as my invention:

1. In combination, a vehicle frame, a radius rod, a lever pivoted between its ends on the frame, a ball and socket joint between one end of the lever and the radius rod, a leaf spring mounted on the other end of the lever, and a yielding, non-metallic shackle connection between the end of the spring and the frame.

2. In combination, a vehicle frame, a radius rod, a lever pivoted between its ends on the frame, a ball and socket joint between one end of the lever and the radius rod, a leaf spring mounted on the other end of the lever, and a shackle connection between the end of the spring and the frame.

3. In combination, a vehicle frame, a radius rod, a lever pivoted between its ends on the frame, a connection between one end of the lever and the radius rod, a leaf spring mounted on the lever at the other end thereof, and a connection between the spring and the frame.

4. In combination, a vehicle frame, a radius rod, a lever pivoted to the frame, a connection between the radius rod and the lever, a leaf spring mounted on the lever, and a connection between the spring and frame.

This specification signed this 11th day of January, A. D. 1929.

PHILIP E. MATTHEWS.